United States Patent
Li et al.

(10) Patent No.: US 8,649,438 B2
(45) Date of Patent: Feb. 11, 2014

(54) SELECTIVE MOTION VECTOR PREDICTION METHOD, MOTION ESTIMATION METHOD AND DEVICE THEREOF APPLICABLE TO SCALABLE VIDEO CODING SYSTEM

(75) Inventors: Gwo-Long Li, Kaohsiung County (TW); Hsiao-Shan Huang, Taoyuan County (TW); Tian-Sheuan Chang, Hsinchu (TW)

(73) Assignee: National Chiao Tung University, Hsinchu (TW)

(*) Notice: Subject to any disclaimer, the term of this patent is extended or adjusted under 35 U.S.C. 154(b) by 660 days.

(21) Appl. No.: 12/951,280

(22) Filed: Nov. 22, 2010

(65) Prior Publication Data
US 2011/0243231 A1    Oct. 6, 2011

(30) Foreign Application Priority Data
Apr. 2, 2010    (TW) ............................... 99110450 A

(51) Int. Cl.
*H04N 7/36* (2006.01)
(52) U.S. Cl.
CPC ............................. *H04N 19/00672* (2013.01)
USPC ................................................... 375/240.16
(58) Field of Classification Search
CPC .................. H04N 7/26297; H04N 19/00672; H04N 19/002; H04N 19/00151; H04N 19/00321
USPC ........................................ 375/E7.256, 240.16
See application file for complete search history.

(56) References Cited

U.S. PATENT DOCUMENTS

| | | | |
|---|---|---|---|
| 2006/0153300 A1* | 7/2006 | Wang et al. | 375/240.16 |
| 2008/0267291 A1* | 10/2008 | Vieron et al. | 375/240.16 |
| 2010/0046622 A1* | 2/2010 | Doser et al. | 375/240.13 |

OTHER PUBLICATIONS

R-D Optimized Multi-Layer Encoder Control for SVC, Heiko Schwarz and Thomas Wiegand, ICIP 2007.*
Low Memory Bandwidth Prediction Method for H.264/AVC Scalable Video Extension, Huang et. al., APSIP ASC 2009.*

* cited by examiner

*Primary Examiner* — Mehrdad Dastouri
*Assistant Examiner* — Mohammed Rahaman
(74) *Attorney, Agent, or Firm* — WPAT, P.C.; Anthony King

(57) ABSTRACT

A selective motion vector prediction method and a motion estimation method and a device thereof applicable to a scalable video coding (SVC) system are disclosed. The selective motion vector prediction method includes the steps of performing an inter prediction to obtain a first motion vector prediction center; performing an inter-layer motion prediction to obtain a second motion vector prediction center; in the case the first and the second motion vector prediction center satisfying a preset condition, using the same reference data to calculate the rate-distortion costs for the inter prediction and the inter-layer motion prediction; and using the rate-distortion costs as a basis to select one of the inter prediction and the inter-layer motion prediction for applying to the SVC system. Thus, the same reference data is shared to enable reduced memory access in the process of coding and accordingly, reduced cost of and power consumption by memory access.

7 Claims, 5 Drawing Sheets

SELECTIVE MOTION VECTOR PREDICTION METHOD, MOTION ESTIMATION METHOD AND DEVICE THEREOF APPLICABLE TO SCALABLE VIDEO CODING SYSTEM

FIELD OF THE INVENTION

The present invention relates to a scalable video coding system, and more particularly to a selective motion vector prediction method, a motion estimation method and a device thereof applicable to a scalable video coding system.

BACKGROUND OF THE INVENTION

In recent years, image and video signal compression techniques have become more and more important in multimedia data storage and transmission, and people demand more for the efficiency and robustness in data storage and transmission. A scalable video coding (SVC) system is extended from the H.264/AVC image encoding standard. This SVC system has the advantages of having low bit output rate, high error resilience, and network-friendly nature, and adopts the concept of layered coding to send bit-streams of different characteristics to an IP network. The SVC system provides three types of scalability, namely, spatial, temporal and quality scalability. According to the SVC system, when an image frame is received, the image frame is down-sampled to generate a base layer, and the originally received image frame is referred to as an enhancement layer. These two layers are coded separately, so as to provide better quality scalability. Therefore, based on the network condition and the user-end device capability, the most suitable bit-stream can be dynamically adjusted for transmission. Thus, video coding based on the SVC system has the prevalence of being suitable for transmission over networks.

The reduction of power consumption has long been an important issue in the development of video encoder because low power consumption allows the video encoder to work longer in the battery environment. Among others, the power consumed by accessing memory for reference data accounts for a very large portion of the total power consumption by the whole video encoder. However, in the prior art, only the power saving through single-layer memory data access is discussed, and the correlation between layers is not taken into consideration. Thus, it is an important issue for all types of inter-layer prediction coding to work out a way to increase the coding speed and reduce the memory data access through efficient data sharing, so as to achieve the target of low memory data access cost and power consumption.

SUMMARY OF THE INVENTION

A primary object of the present invention is to provide a selective motion vector prediction method, a motion estimation method and a device thereof applicable to scalable video coding (SVC) system, so that the high correlation between different spatial layers is used to achieve better sharing of reference data to thereby effectively reduce the cost of and the power consumption by memory access.

To achieve the above and other objects, the present invention proposes a selective motion vector prediction method applicable to the SVC system. The SVC system is adapted to receive an image frame and generates a first layer of low resolution and a second layer of high resolution based on the received image frame. The selective motion vector prediction method according to the present invention includes the following steps: performing a first motion vector prediction based on the first layer, so as to obtain a first motion vector; obtaining a first reference data; performing the first motion vector prediction based on the second layer and the first reference data, so as to obtain a motion vector prediction center and a second motion vector; performing a rate-distortion evaluation based on the second layer, the first reference data, and the second motion vector, so as to obtain a first rate-distortion cost (RD-cost); determining whether the first motion vector and the motion vector prediction center satisfy a preset condition; in the case the first motion vector and the motion vector prediction center satisfying the preset condition, performing a second motion vector prediction based on the second layer, the first motion vector, and the first reference data, so as to obtain a third motion vector; performing the rate-distortion evaluation based on the second layer, the first reference data, and the third motion vector, so as to obtain a second RD-cost; and using the first RD-cost and the second RD-cost as a basis to select one of the first motion vector prediction and the second motion vector prediction for applying to the SVC system.

In the case the first motion vector and the motion vector prediction center do not satisfy the preset condition, the first motion vector prediction is selected for applying to the SVC system.

In the selective motion vector prediction method of the present invention, the first motion vector prediction is an inter prediction.

In the selective motion vector prediction method of the present invention, the second motion vector prediction is an inter-layer motion prediction.

In the selective motion vector prediction method of the present invention, the first layer is a base layer, and the second layer is an enhancement layer; and the base layer is obtained by down-sampling of the enhancement layer.

In an operable embodiment of the selective motion vector prediction method of the present invention, the second motion vector prediction is an inter base layer prediction, and the third motion vector is equal to the first motion vector.

According to the operable embodiment, in the case the first motion vector and the motion vector prediction center do not satisfy the preset condition, a second reference data is further obtained; the rate-distortion evaluation is performed based on the second layer, the second reference data, and the third motion vector, so as to obtain a third RD-cost; and the first RD-cost and the third RD-cost are used as a basis to select one of the first motion vector prediction and the second motion vector prediction for applying to the SVC system.

In the selective motion vector prediction method of the present invention, the preset condition is that whether or not a difference between the first motion vector and the motion vector prediction center is smaller than a threshold value.

To achieve the above and other objects, the present invention also proposes a motion estimation method applicable to the SVC system. The SVC system separately uses an inter prediction and an inter-layer residual prediction to perform a motion vector prediction for a current frame. The motion estimation method includes the following steps: receiving a reference frame and a residual data; calculating based on the current frame and the reference frame to obtain a first difference for use in the inter prediction; and using the first difference and the residual data as a basis to calculate a second difference for use in the inter-layer residual prediction.

In the motion estimation method of the present invention, the residual data is a prediction residual value obtained from an up-sampling of a base layer generated by the SVC system.

In the motion estimation method of the present invention, the reference frame is a previous frame relative to the current frame.

To achieve the above and other objects, the present invention further proposes a motion estimation device applicable to the SVC system. The SVC system stores a current frame, a reference frame, and a residual data therein, and separately uses an inter prediction and an inter-layer residual prediction to perform a motion vector prediction for the current frame. The motion estimation device of the present invention includes an access element, a first subtracter, and a second subtracter. The access element reads a first block data of the current frame, a second block data of the reference frame, and the residual data. The first subtracter calculates a first difference between the first block data and the second block data, and the first difference is output for use in the inter prediction. And, the second subtracter calculates a second difference between the first difference and the residual data, and the second difference is output for use in the inter-layer residual prediction.

In the motion estimation device of the present invention, the residual data is a prediction residual value obtained from an up-sampling of a base layer generated by the SVC system.

In the motion estimation device of the present invention, the reference frame is a previous frame relative to the current frame.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
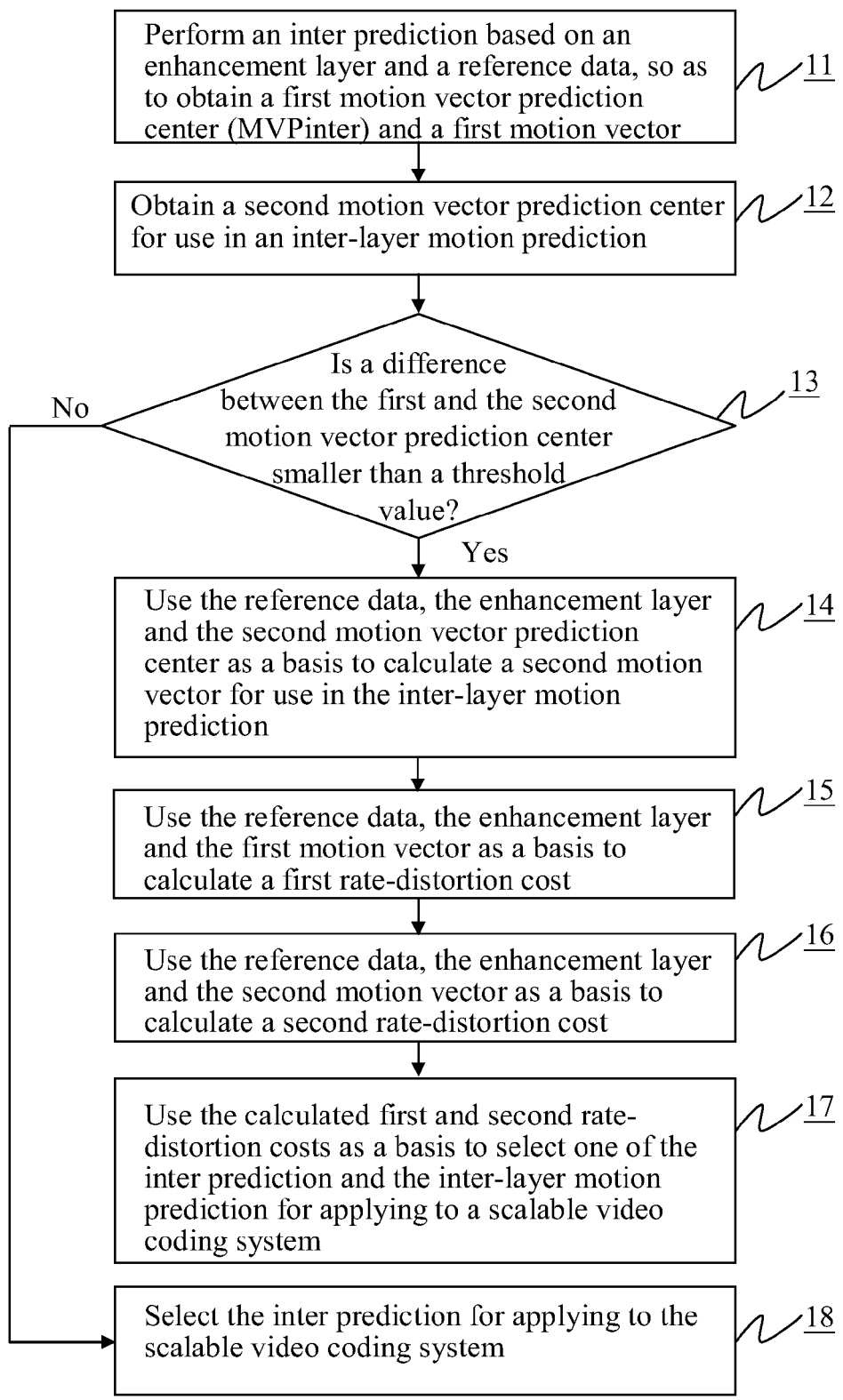
FIG. 1 is a flowchart showing the steps included in a selective motion vector predication method applicable to scalable video coding system according to a first embodiment of the present invention.

Please refer to FIG. 1 that is a flowchart showing the steps included in a selective motion vector prediction method according to a first embodiment of the present invention. The selective motion vector prediction method in the first embodiment is applicable to a scalable video coding (SVC) system. The SVC system is adapted to receive a plurality of image frames and generates from each of these image frames a first layer of low resolution and a second layer of high resolution. For example, the originally received image frame can be the second layer and referred to as an enhancement layer. Then, the originally received image frame is down-sampled to generate an image, which is the first layer and referred to as a base layer. Alternatively, the originally received image frame can be the first layer and is up-sampled to produce an image, which is the second layer.

As shown in FIG. 1, the selective motion vector prediction method in the first embodiment includes the following steps, so as to perform motion vector prediction based on a current frame. In a step 11, an inter prediction is performed based on the enhancement layer and a reference data, so as to obtain a first motion vector prediction center ($MVP_{inter}$) and a first motion vector. In a step 12, the inter prediction is performed based on the base layer, so as to obtain a second motion vector, which is then up-sampled to obtain a second motion vector prediction center ($MVP_{ILM}$) for use in an inter-layer motion prediction. Here, when performing the inter prediction, a motion vector prediction center would be generated first; and this motion vector prediction center and the base layer are used as a basis to calculate the first motion vector. Since the inter prediction is known by a person of ordinary skill in the art, it is not discussed in details herein. Preferably, the reference data is a previous frame relative to the current frame.

In a step 13, it is determined whether a difference between the first motion vector prediction center ($MVP_{inter}$) and the second motion vector prediction center ($MVP_{ILM}$) is smaller than a threshold value. The threshold value can be statistically decided by finding the relation between different motion vector prediction center differences and different search ranges, and the most suitable search range to cover the largest possible prediction result. For example, in the case more than 80% of the prediction result of the inter prediction and the inter-layer motion prediction can be covered when the motion vector prediction center and the search range are both set to be 8 pixels, then the threshold value can be set to 8 pixels.

In the case the difference between the first motion vector prediction center ($MVP_{inter}$), and the second motion vector prediction center ($MVP_{ILM}$) is smaller than the preset threshold value, then, in a step 14, the above-mentioned reference data, enhancement layer, and second motion vector prediction center are used as a basis to calculate a second motion vector for use in the inter-layer motion prediction. In a step 15, the above-mentioned reference data, enhancement layer, and first motion vector are used as a basis to calculate a first rate-distortion cost for the inter prediction (RD_Cost for Inter). In a step 16, the above-mentioned reference data, enhancement layer, and second motion vector are used as a basis to calculate a second rate-distortion cost for the inter-layer motion prediction (RD_Cost for ILM). In a step 17, the calculated first RD_Cost and second RD_Cost are used as a basis to select one of the inter prediction and the inter-layer motion prediction for applying to the SVC system. In the case the first RD_Cost is smaller than the second RD_Cost, the inter prediction is applied to the SVC system; on the other hand, in the case the first RD_Cost is larger than the second RD_Cost, the inter-layer motion prediction is applied to the SVC system.

In the case a difference between the first motion vector prediction center ($MVP_{inter}$) and the second motion vector prediction center ($MVP_{ILM}$) is larger than the preset threshold value, then, in a step 18, the inter prediction is selected for applying to the SVC system, and the inter-layer motion prediction is ignored.

Figure 2:
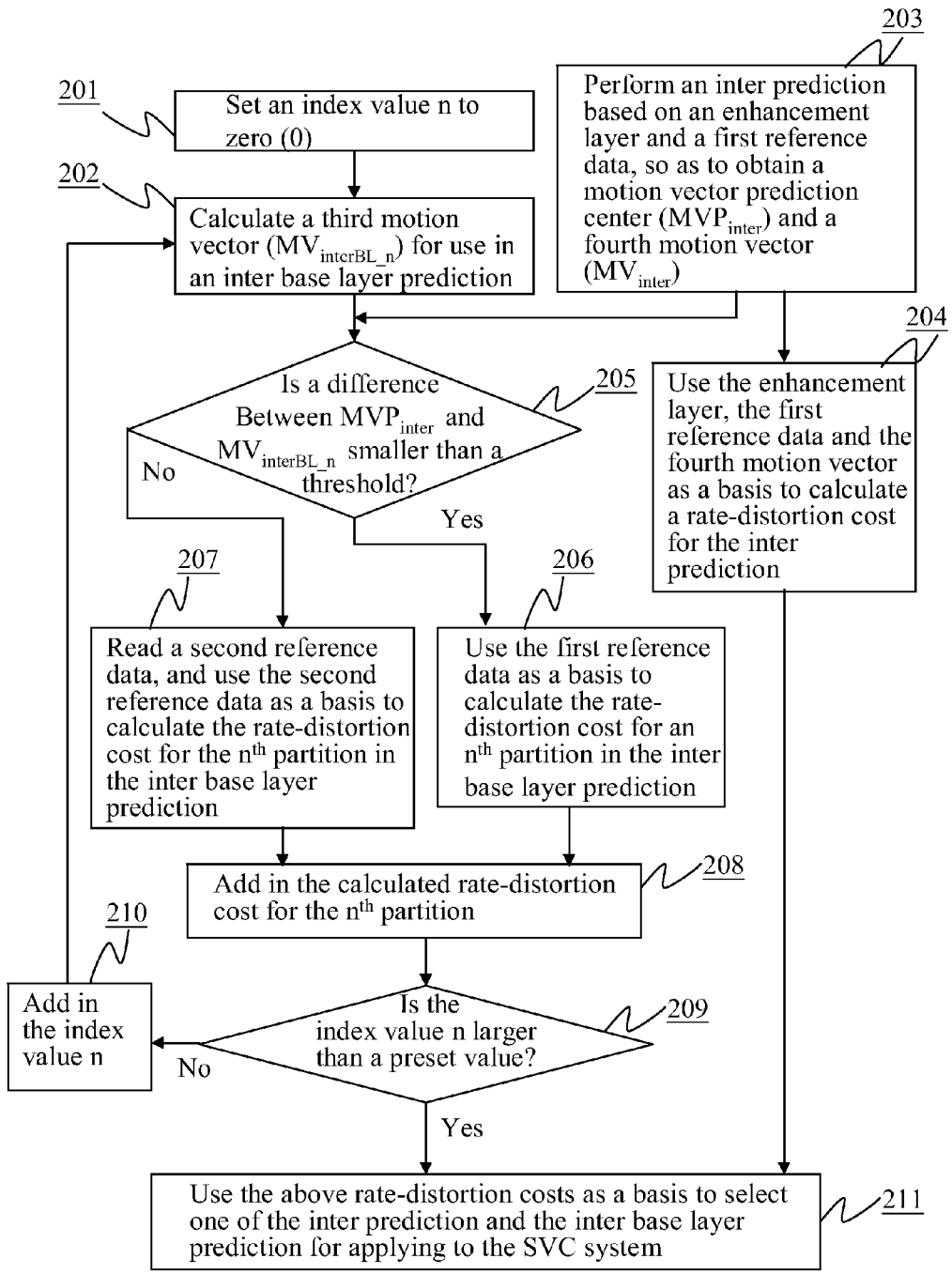
FIG. 2 is a flowchart showing the steps included in a selective motion vector predication method applicable to scalable video coding system according to a second embodiment of the present invention.

Please refer to FIG. 2 that is a flowchart showing the steps included in a selective motion vector prediction method according to a second embodiment of the present invention. The selective motion vector prediction method in the second embodiment is applicable to a scalable video coding (SVC)

system. The SVC system is adapted to receive a plurality of image frames and generates from each of these image frames a first layer of low resolution and a second layer of high resolution. For example, the originally received image frame can be the second layer and referred to as an enhancement layer. Then, the originally received image frame is down-sampled to generate an image, which is the first layer and referred to as a base layer. Alternatively, the originally received image frame can be the first layer and is up-sampled to generate an image, which is the second layer. As shown in FIG. 2, the selective motion vector prediction method in the second embodiment includes the following steps. In a step 201, an index value n is set to zero (0). The index value n is used to indicate one of a plurality of blocks of the base layer. In a step 202, an inter prediction is performed based on a block n of the base layer, in order to obtain a base layer motion vector. Since the base layer is an image obtained by down-sampling the original image frame, the base layer motion vector can be up-sampled to obtain a third motion vector ($MV_{interBL\_n}$) for use in an inter base layer prediction.

In a step 203, the inter prediction is performed based on the enhancement layer and a first reference data, so as to obtain a fourth motion vector prediction center ($MVP_{inter}$) and a fourth motion vector ($MV_{inter}$). Thereafter, in a step 204, the enhancement layer, the first reference data and the fourth motion vector are used as a basis to calculate the rate-distortion cost for the inter prediction.

In a step 205, it is determined whether a difference between the third motion vector ($MV_{interBL\_n}$) and the fourth motion vector prediction center ($MVP_{inter}$) is smaller than a preset threshold value. If yes, in a step 206, the enhancement layer, the first reference data, and the third motion vector ($MV_{interBL\_n}$) are used as a basis to calculate the rate-distortion cost for an $n^{th}$ partition (RD_Cost for partition n) in the inter base layer prediction; or if no, in a step 207, a second reference data is read, and the enhancement layer, the second reference data and the third motion vector ($MV_{interBL\_n}$) are used as a basis to calculate the rate-distortion cost for the $n^{th}$ partition (RD_Cost for partition n) in the inter base layer prediction. Then, in a step 208, the calculated RD_Cost for partition n is added to previously calculated RD_Costs for the partition 0, partition 1 . . . and partition n−1. In a step 209, it is determined whether the index value n is larger than a preset value. If no, it means there are still other base layer blocks that have not yet been calculated, thus, in a step 210, the index value n is added, and then, the step 202 is executed again; or, if yes, it means all the blocks of the base layer have been calculated, and a sum of the RD_Costs obtained in the step 208 is also the RD_Cost for the inter base layer prediction. Therefore, a step 211 is executed to use the aforesaid RD_Costs as a basis to select one of the inter prediction and the inter base layer prediction for applying to the SVC system.

Figure 3:
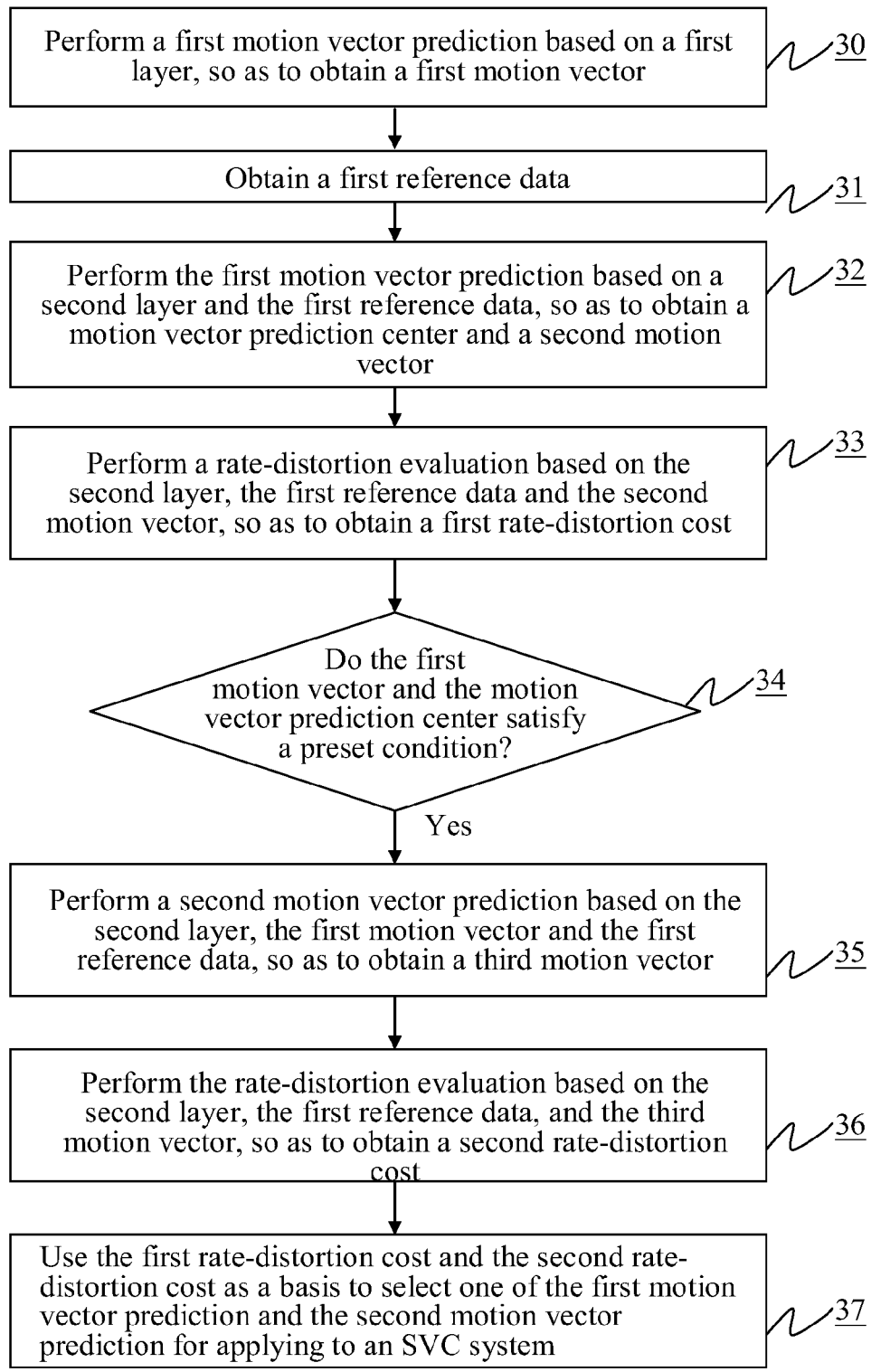
FIG. 3 is a flowchart showing the steps included in a selective motion vector predication method applicable to scalable video coding system according to a third embodiment of the present invention.

Please refer to FIG. 3 that shows the steps included in a selective motion vector prediction method according to a third embodiment of the present invention. As shown, in a step 30, a first motion vector prediction is performed based on the first layer, so as to obtain a first motion vector. In a step 31, a first reference data is obtained. In a step 32, the first motion vector prediction is performed based on the second layer and the first reference data, so as to obtain a motion vector prediction center and a second motion vector. In a step 33, a rate-distortion estimation is performed based on the second layer, the first reference data, and the second motion vector, so as to obtain a first rate-distortion cost (RD-cost). In a step 34, it is determined whether the first motion vector and the motion vector prediction center satisfy a preset condition.

In the case the first motion vector and the motion vector prediction center satisfy the preset condition, then, in a step 35, a second motion vector prediction is performed based on the second layer, the first motion vector, and the first reference data, so as to obtain a third motion vector. In a step 36, the rate-distortion estimation is performed based on the second layer, the first reference data and the third motion vector, so as to obtain a second RD-cost. For example, the above-mentioned preset condition can be that whether a difference between the first motion vector and the motion vector prediction center is smaller than a threshold value. Preferably, the first motion vector prediction is an inter prediction, and the second motion vector prediction is an inter-layer motion prediction or an inter base layer prediction. Finally, in a step 37, the first RD-cost and the second RD-cost are used as a basis to select one of the first motion vector prediction and the second motion vector prediction for applying to the SVC system.

In the case it is determined in the step 34 that the first motion vector and the motion vector prediction center do not satisfy the preset condition, the following several steps can be further performed: (1) directly selecting the first motion vector prediction for applying to the SVC system; or (2) further obtaining a second reference data; performing the rate-distortion estimation based on the second layer, the second reference data, and the third motion vector, so as to obtain a third RD-cost; and using the first RD-cost and the third RD-cost as a basis to select one of the first motion vector prediction and the second motion vector prediction for applying to the SVC system.

From the above explanation, it can be understood the motion vector prediction can be selected based on the rate-distortion costs. In the prior art, the following formula (1) is used to calculate the distortion for the inter prediction, and the formula (2) is used to calculate the distortion for an inter-layer residual prediction:

$$D_{INTER}(i, j) = \sum_{i=0}^{height} \sum_{j=0}^{width} |C(i, j) - F(i, j)| \quad (1)$$

$$D_{ILres}(i, j) = \sum_{i=0}^{height} \sum_{j=0}^{width} |C(i, j) - B(i, j) - F(i, j)| \quad (2)$$

where, C(i,j) is the pixel value of the coding block of the current frame; B(i,j) is the residual value of the base layer after up-sampling thereof; F(i,j) is the pixel value of the reference frame; height and width respectively represent the height and width of the current frame; $D_{INTER}(i,j)$ is the distortion for the inter prediction; and $D_{ILres}(i,j)$ is the distortion for the inter-layer residual prediction.

As can be observed from the formulas (1) and (2), the only difference between the distortion estimation for the inter-layer residual prediction and for the inter prediction lies in that whether or not the residual value of the base layer after the up-sampling thereof is subtracted from the data of the current macroblock; and, both types of distortion estimation use the same reference frame. Thus, in the present invention, there is proposed a motion estimation device 44 for calculating the distortion for the inter-layer residual prediction at the same time the distortion for the inter prediction is calculated, so that the number of times for repeatedly accessing the reference data can be reduced, and the cost of and the power consumed by memory access can also be reduced.

Figure 4:
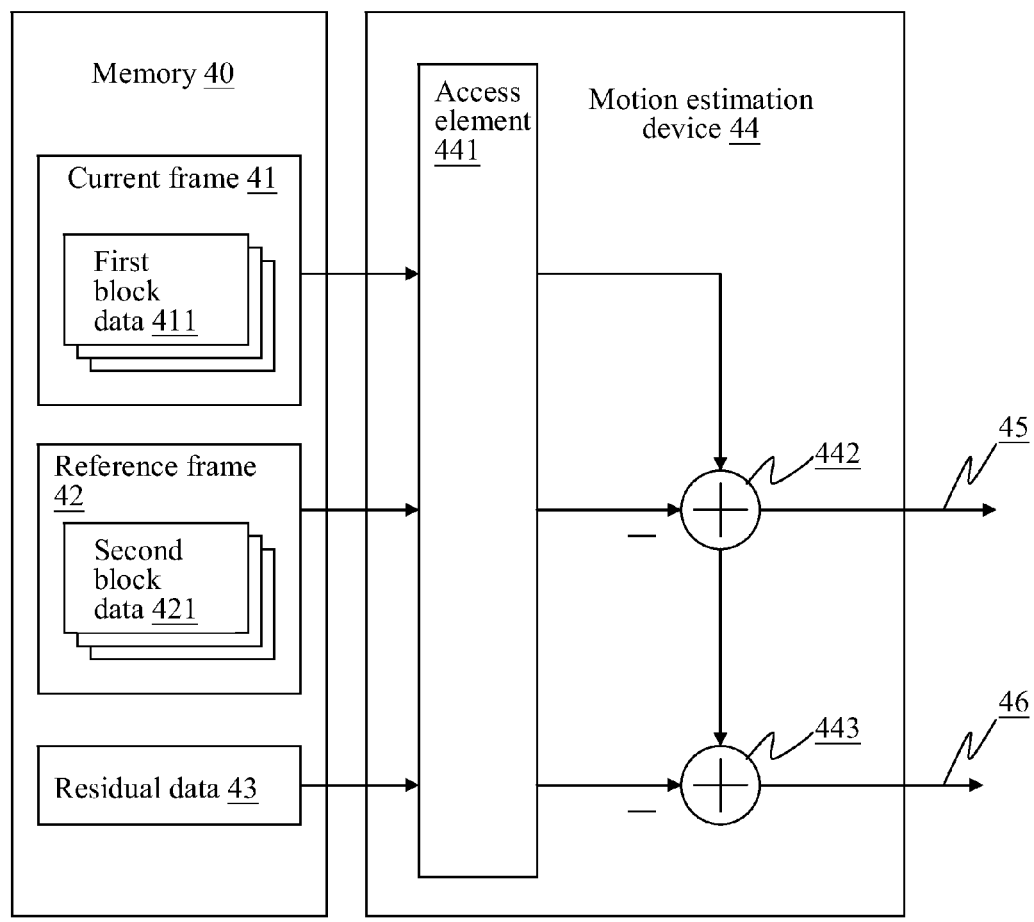
FIG. 4 is a conceptual view showing the operation of a motion estimation device applicable to scalable video coding system according to the present invention.

Please refer to FIG. 4 that is a conceptual view showing the operation of the motion estimation device 44 according to the present invention. The motion estimation device 44 is applicable to the scalable video coding (SVC) system that is able to perform both the inter prediction and the inter-layer residual prediction. As shown, the motion estimation device 44 includes an access element 441, a first subtracter 442, and a second subtracter 443. The access element 441 reads from a memory 40 of the SVC system a first block data 411 of a current frame 41, a second block data 421 of a reference frame 42, and a residual data 43. First, the first subtracter 442 calculates a first difference 45 between the first block data 411 and the second block data 421. An absolute value of the first difference 45 is output for use in the distortion estimation for the inter prediction. Then, the second subtracter 443 calculates a second difference 46 between the first difference 45 and the residual data 43. An absolute value of the second difference 46 is output for use in the distortion estimation for the inter-layer residual prediction. The operating principle of the motion estimation device 44 can be expressed by the following formula (3):

$$D_{ILres}(i,j) = \sum_{i=0}^{height} \sum_{j=0}^{width} |C(i,j) - F(i,j) - B(i,j)| \quad (3)$$

In calculating the second difference 46, it is not necessary for the access element 441 to read the second block data 421 of the reference frame 42 from the memory 40. Therefore, the objects of the present invention can be achieved.

Figure 5:
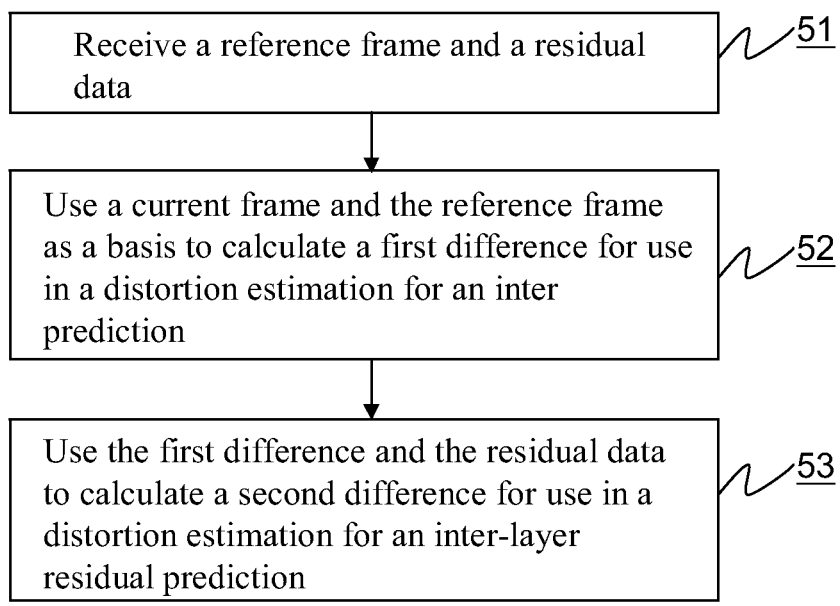
FIG. 5 is a flowchart showing the steps included in a motion estimation method applicable to scalable video coding system according to the present invention.

Please refer to FIG. 5 that is a flowchart showing the steps included in a motion estimation method according to the present invention. The motion estimation method is applicable to the SVC system that separately uses the inter prediction and the inter-layer residual prediction to perform motion vector prediction for a current frame. As shown, in a step 51 of the motion estimation method, a reference frame and a residual data are received. In a step 52, the current frame and the reference frame are used as a basis to calculate a first difference; and an absolute value of the first difference is used in a distortion estimation for the inter prediction. Then, in a step 53, the first reference and the residual data are used as a basis to calculate a second difference; and an absolute value of the second difference is used in a distortion estimation for the inter-layer residual prediction.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A selective motion vector prediction method applicable to scalable video coding (SVC) system, the SVC system being adapted to receive an image frame and generate from the image frame a first layer of low resolution and a second layer of high resolution, the method comprising the steps of:
obtaining a first motion vector by performing a first motion vector prediction based on the first layer of the image frame;
obtaining a first reference data;
obtaining a second motion vector and a motion vector prediction center by performing the first motion vector prediction based on the second layer of the image frame and the first reference data;
obtaining a first rate-distortion cost (RD-cost) by performing a rate-distortion evaluation based on the second layer, the first reference data, and the second motion vector, wherein the second motion vector is obtained by performing the first motion vector prediction based on the second layer and the first reference data;
determining whether the first motion vector and the motion vector prediction center satisfy a preset condition, wherein the preset condition is satisfied when a difference between the first motion vector and the motion vector prediction center is smaller than a threshold value;
in the case the first motion vector and the motion vector prediction center satisfying the preset condition, obtaining a third motion vector by performing a second motion vector prediction based on the second layer, the first motion vector obtained by performing the first motion vector prediction based on the first layer, and the first reference data used for obtaining both of the second motion vector and the third motion vector;
obtaining a second rate-distortion cost (RD-cost) by performing the rate-distortion evaluation based on the second layer, the first reference data and the third motion vector after the obtaining the third motion vector; and
selecting one of the first motion vector prediction and the second motion vector prediction by using the first RD-cost, which is based on the first motion vector prediction, and the second RD-cost, which is based on the second motion vector prediction, for applying to the SVC system.

2. The selective motion vector prediction method as claimed in claim 1, wherein, in the case the first motion vector and the motion vector prediction center do not satisfy the preset condition, the first motion vector prediction is selected for applying to the SVC system.

3. The selective motion vector prediction method as claimed in claim 1, wherein the first motion vector prediction is an inter prediction.

4. The selective motion vector prediction method as claimed in claim 1, wherein the second motion vector prediction is an inter-layer motion prediction.

5. The selective motion vector prediction method as claimed in claim 1, wherein the first layer is a base layer and the second layer is an enhancement layer; and the base layer is obtained by down-sampling the enhancement layer.

6. The selective motion vector prediction method as claimed in claim 1, wherein the second motion vector prediction is an inter base layer prediction, and the third motion vector is equal to the first motion vector.

7. The selective motion vector prediction method as claimed in claim 6, further comprising the following steps in the case the first motion vector and the motion vector prediction center do not satisfy the preset condition:
further obtaining a second reference data;
obtaining a third RD-cost by performing the rate-distortion evaluation based on the second layer, the second reference data and the third motion vector, so as to obtain a third RD-cost; and
selecting one of the first motion vector prediction and the second motion vector prediction by using the first RD-cost, which is based on the first motion vector prediction and the first reference data, and the third RD-cost, which is based on the second motion vector prediction and the second reference data, for applying to the SVC system.

* * * * *